United States Patent [19]
Conaway

[11] Patent Number: 6,002,325
[45] Date of Patent: Dec. 14, 1999

[54] SEAT BELT STATUS ALERTING UNIT

[75] Inventor: Brian J. Conaway, Columbus, Ohio

[73] Assignee: Blue Ridge International Products Company, Freeport, Fla.

[21] Appl. No.: 09/151,987

[22] Filed: Sep. 11, 1998

Related U.S. Application Data

[63] Continuation-in-part of application No. 09/138,488, Aug. 24, 1998, abandoned.

[51] Int. Cl.⁶ ........................................... G08B 3/00
[52] U.S. Cl. .................. 340/384.1; 340/457; 340/457.1; 180/268; 200/61.58 B
[58] Field of Search ................ 340/384.1, 457, 340/457.1; 180/268; 200/16.58 B

[56]      References Cited

U.S. PATENT DOCUMENTS

| | | |
|---|---|---|
| 3,462,731 | 8/1969 | Gray . |
| 3,840,849 | 10/1974 | Lohr . |
| 4,000,385 | 12/1976 | Colasanti . |
| 4,001,532 | 1/1977 | Kubota et al. . |
| 4,012,612 | 3/1977 | Loomba . |
| 4,047,267 | 9/1977 | Lindblad . |
| 4,060,878 | 12/1977 | Dyki . |
| 4,608,469 | 8/1986 | Doty . |
| 4,785,906 | 11/1988 | Kang . |
| 5,380,067 | 1/1995 | Turvill et al. . |
| 5,406,252 | 4/1995 | Dear . |
| 5,483,221 | 1/1996 | Mutter et al. . |
| 5,627,512 | 5/1997 | Bogar . |
| 5,742,986 | 4/1998 | Corrion et al. . |
| 5,760,684 | 6/1998 | Orbach . |
| 5,898,366 | 4/1999 | Brown et al. .......................... 340/457.1 |

*Primary Examiner*—Nina Tong
*Attorney, Agent, or Firm*—Carter & Schnedler, P.A.

[57]      ABSTRACT

A status alerting unit for a seat belt having a connectable buckle and tongue, particularly for use in the supervision of children riding in a vehicle. The unit has a housing mountable to the seat belt buckle. A proximity sensor, such as a pivoting flipper element, is deflected when the seat belt tongue is inserted into the buckle, and generates BUCKLED and UNBUCKLED signals. An audible alert device generates appropriate alert signals in response. A low battery voltage warning is also provided. The unit is self-contained and functions properly with a wide variety of existing seat belt assemblies, without interfering in any way with a user's accustomed seat belt operation, or requiring special care or attention while the tongue is inserted and latched into the buckle.

27 Claims, 16 Drawing Sheets

SEAT BELT STATUS ALERTING UNIT

CROSS-REFERENCE TO RELATED APPLICATION

This is a continuation-in-part of application Ser. No. 09/138,488, filed Aug. 24, 1998, which is now abandoned.

BACKGROUND OF THE INVENTION

The invention relates generally to a seat belt status alerting unit and, more particularly, to such a unit for providing alert signals when a seat belt is buckled and unbuckled.

Seat belt warning devices are of particular potential benefit in the supervision of children riding in a vehicle. A seat belt status alerting unit, particularly one which provides an audible indication, can assist an adult in determining that a child has buckled his or her seat belt and, perhaps more importantly, can alert the adult when the child has unbuckled the seat belt.

Any such device necessarily must include a switch or sensor of some sort for determining when the seat belt is in use and when it is not, typically by sensing the insertion of a seat belt tongue into the corresponding buckle. A wide variety of seat belt buckle designs have been proposed incorporating a switch or sensor within the buckle for sensing the insertion and withdrawal of the seat belt tongue. Signals from such buckle switches typically are connected to vehicle wiring during manufacture, and may be employed to activate both audible and visual alarms, such as indicators on the vehicle dashboard.

Such buckles including switches or other sensors are of use only when actually present, typically by being provided as part of a vehicle. Moreover, they typically serve other primary functions rather than being specialized as a child seat belt safety warning device.

Accordingly, add on accessory seat belt safety warning devices have been proposed, such as are disclosed in Dear U.S. Pat. No. 5,406,252 and Bogar U.S. Pat. No. 5,627,512.

Dear U.S. Pat. No. 5,406,252 discloses a seat belt warning device in the form a self-contained electronic unit mounted externally to a seat belt buckle. A slider sensing element projects from the unit, and slot on the slider is engaged by a seat belt tongue as the tongue is inserted into the buckle.

Bogar U.S. Pat. No. 5,627,512 discloses a different approach to providing a seat belt warning device, in the form of a housing which at one end receives the existing seat belt tongue, and which at the other end has a new tongue which engages the existing buckle. The Bogar unit is thus mechanically connected in series between the existing seat belt tongue and buckle, and is positioned in an end-to-end relationship with the buckle when connected. A sensor switch projects from the end of the unit and engages the buckle as the new tongue is inserted into the buckle.

A shortcoming of both the Dear and Bogar approaches is a lack of universality, a significant requirement for an add-on device not part of the vehicle seat belt system as originally manufactured. Thus, there are a variety of different seat belt buckle designs among the many types of vehicles which have been manufactured, and it is difficult to provide an add-on device which works effectively with a wide range of these existing seat belt buckles and without interfering with normal usage.

For example, the slidable sensing element of the device disclosed in Dear U.S. Pat. No. 5,406,252 requires additional care on the part of the user to align the seat belt tongue with the slot on the slider element while inserting the tongue straight into the buckle. Seat belt users however typically start inserting a seat belt tongue into the corresponding buckle at an angle, and most seat belt buckles are designed to properly guide and align the tongue even though the tongue may have initially been inserted at an angle. Further, commercial embodiments of a device similar to that which is disclosed in Dear U.S. Pat. No. 5,406,252 are sold with adapters to accommodate various seat belt designs.

The approach of Bogar U.S. Pat. No. 5,627,512 is even less universal, because the new tongue of the Bogar device must be sufficiently similar to the existing seat belt tongue to assure proper latching operation, making the provision of a universal device rather unlikely with that particular approach.

Another consideration in such devices is providing a low battery indication. The device disclosed in Dear U.S. Pat. No. 5,406,252, during operation, emits three audible "beeps" over a duration of approximately one second when the seat belt tongue is inserted into the buckle, and emits a stream of beeps over an interval of approximately three seconds when the tongue is removed from the buckle. If no "beeps" are heard when the tongue is inserted, it is assumed that the battery is low, and must be replaced.

SUMMARY OF THE INVENTION

It is therefore seen to be desirable to provide a self-contained add-on status alerting unit for a seat belt, which unit functions properly with a wide variety of existing seat belt buckles and tongues, and without interfering in any way with a user's accustomed seat belt operation, or requiring special care or attention while the tongue is inserted and latched into the buckle.

It is also seen to be desirable to provide informative and effective low battery indications in such a self-contained unit.

The invention provides a status alerting unit for a seat belt of the type having a connectable buckle and tongue. The buckle has an end with a slot for receiving the tongue, and an exterior surface which intersects the buckle end, the exterior surface being generally parallel to the tongue when the tongue is inserted into the slot.

In an exemplary embodiment of the invention, the status alerting unit comprises a housing having at least a main portion, with a mounting surface mountable to the buckle exterior surface, for example by an adhesive material on the mounting surface, such as double-sided foam tape. In a more particular embodiment, the housing includes a projecting portion which projects beyond the buckle end when the housing is mounted to the buckle, the projecting portion terminating in an end of the housing.

A proximity sensor, such as a Hall effect magnetic field sensing device, an optical sensor, or a mechanical sensing element, is carried by the housing projecting portion and is responsive to the proximity of the tongue for generating BUCKLED and UNBUCKLED signals as the tongue is inserted into and removed from the slot.

In one embodiment, a flipper element is pivotally mounted to the housing. The flipper element includes a tongue sensing portion which pivots away from and towards the slot respectively between an extended position generally perpendicular to the mounting surface, and a fully deflected position. The tongue sensing portion extends laterally a distance along the housing. The flipper element is positioned such that the tongue sensing portion is in the extended position with the tongue is not inserted into the buckle slot and the tongue sensing portion pivots at least part way towards the fully deflected position when the tongue is inserted into the buckle slot. In embodiments where the housing has a projecting portion, the flipper element is pivotally mounted to the housing projecting portion adjacent the housing end.

At least one electrical switching element is connected to the flipper element for generating BUCKLED and UNBUCKLED signals as the tongue is inserted into and removed from the slot. An alert device, such as audible alert device in the form of a voice message device, is connected to the electrical switching element for generating respective buckled and unbuckled alert signals in response to the BUCKLED and UNBUCKLED signals.

The housing includes a locating lip for engaging the buckle end to aid in properly positioning the housing on the buckle. In one embodiment, the lip comprises a ledge on the housing projecting portion, and the ledge includes an interior volume which contains at least a portion of the proximity sensor, such as a recess into which the flipper element tongue sensing portion is at least partially received when in the fully deflected position.

In one embodiment, the unit includes a voltage source, such as a self-contained battery, a photovoltaic cell, or a connection to an external voltage source, for powering the alert device. The alert device additionally generates a low voltage alert signal in response to a LOW VOLTAGE signal. The unit includes a low voltage detection circuit connected to the voltage source for determining whether voltage source voltage is below a predetermined threshold voltage. The low voltage detection circuit is operable for enabling the low voltage detection circuit in response to at least one of the BUCKLED and UNBUCKLED signals, to pass the BUCKED or UNBUCKLED signal on to the alert device only when voltage source voltage is not below the predetermined threshold voltage, and to apply the LOW VOLTAGE signal to the alert device when voltage source voltage is below the predetermined threshold voltage.

This construction has a number of advantages over the prior art. The flipper element pivotally mounted to the housing projecting portion, and the way the housing is mounted to the buckle, enable the unit to effectively function with a wide variety of seat belt buckle designs, and without interfering with a user's accustomed operation of the seat belt. The locating lip and ledge as a practical matter assure correct mounting of the unit to a seat belt buckle. A meaningful low battery indication is given at times when a person is present to actually hear the low battery alarm, namely, when the tongue is being inserted and removed from the seat belt buckle.

BRIEF DESCRIPTION OF THE DRAWINGS

While the novel features of the invention are set forth with particularity in the appended claims, the invention, both as to organization and content, will be better understood and appreciated, from the following detailed description, taken in conjunction with the drawings, in which:

DETAILED DESCRIPTION

Figure 2:
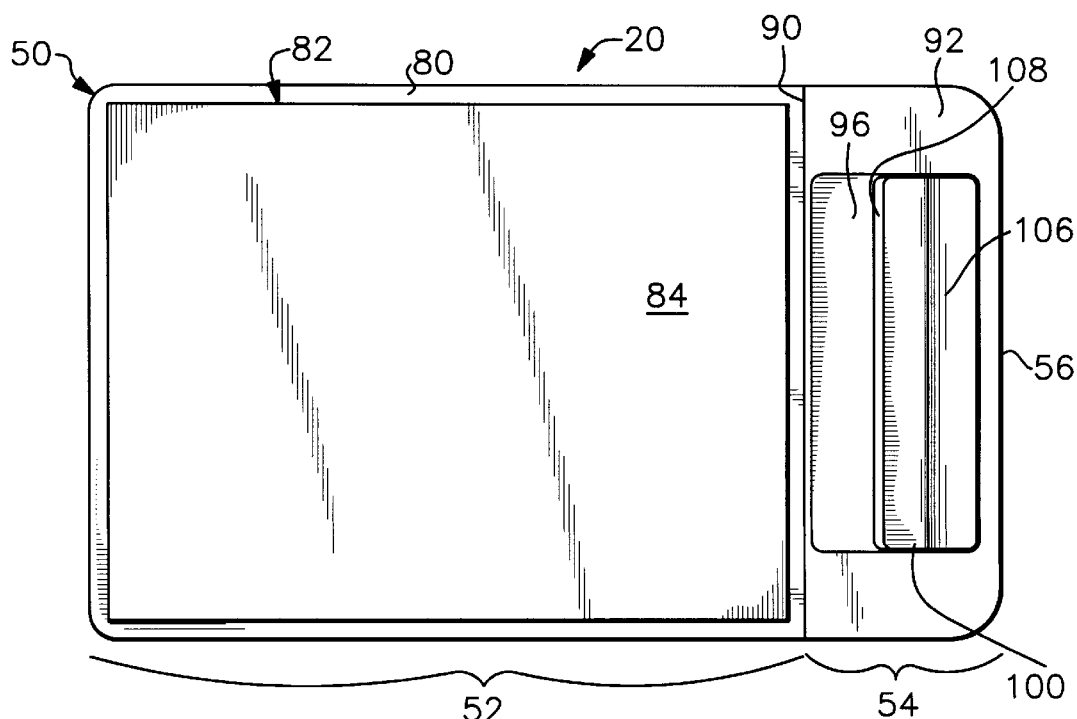
FIG. 2 is an underside view of the unit, taken on line 2—2 of FIG. 1.
Figure 3:
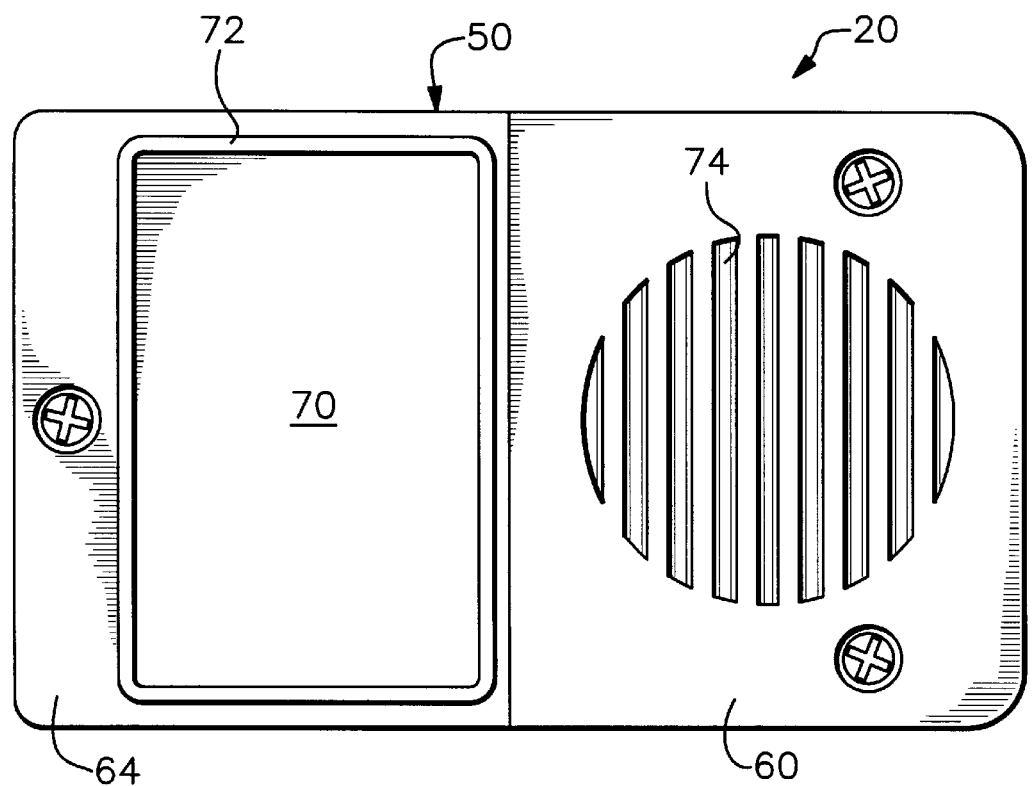
FIG. 3 is a top plan view of the unit, taken on line 3—3 of FIG. 1.
Figure 6:
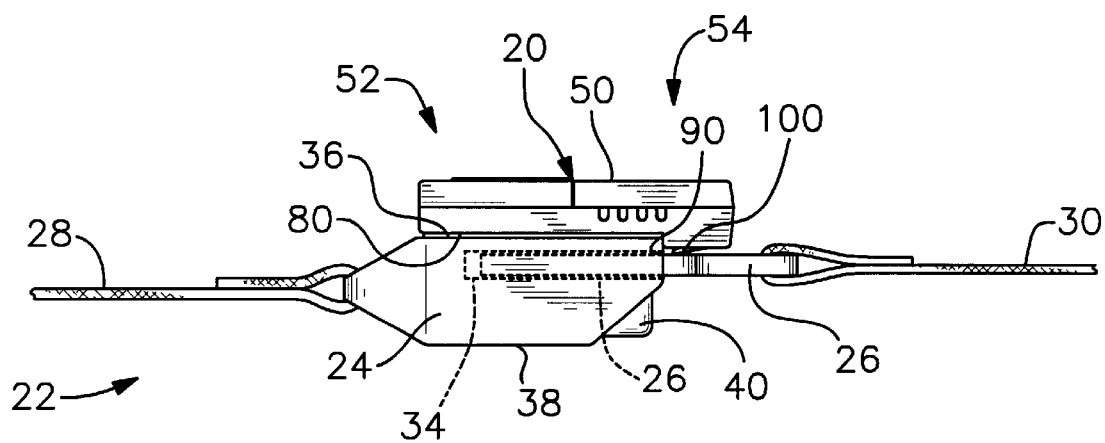
FIG. 6 is a similar view, showing the configuration when the seat belt tongue has been inserted into the buckle.
Figure 4:
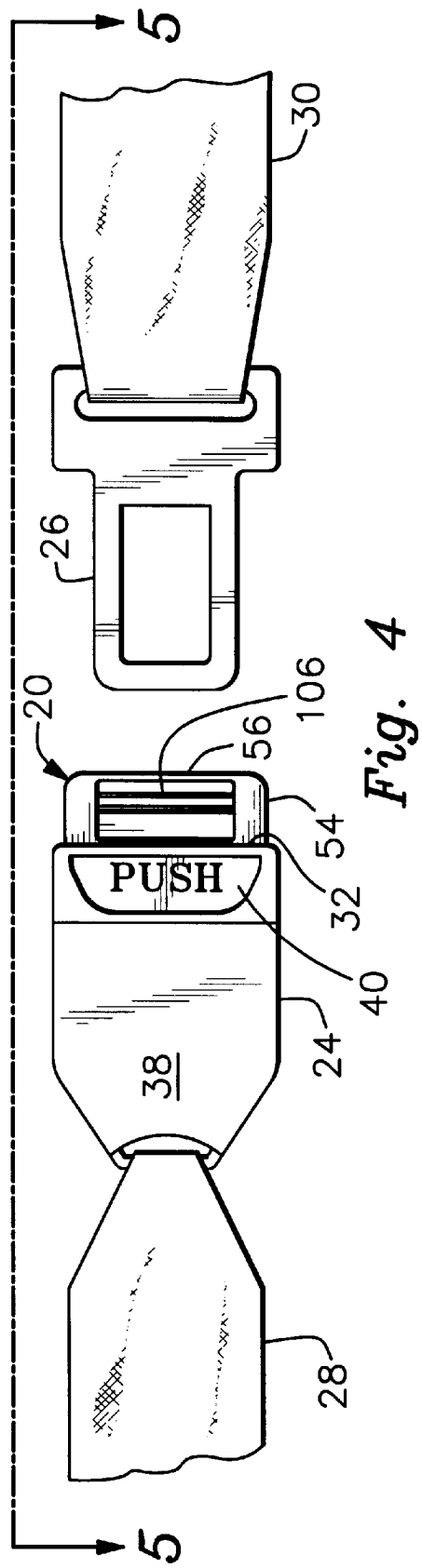
FIG. 4 is a underside view of a seat belt buckle and tongue in position to be connected, with a status alerting unit embodying the invention attached to the buckle, and the projecting portion of the unit housing visible.
Figure 5:
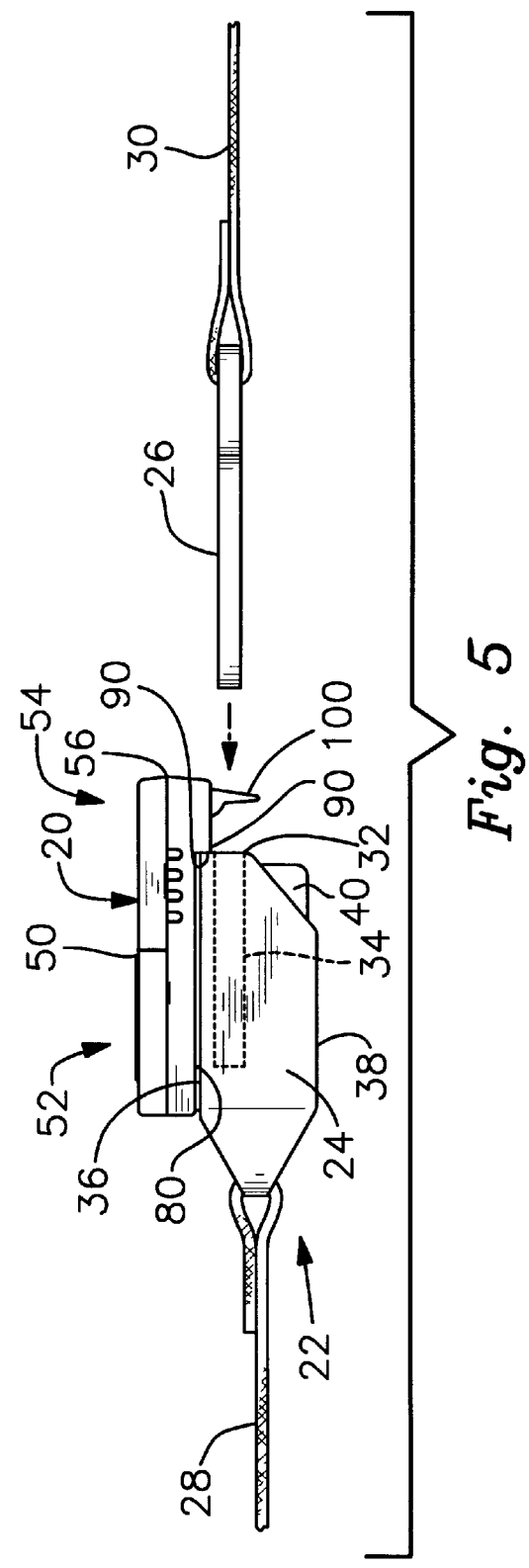
FIG. 5 is a side elevational view taken on line 5—5 of FIG. 4.

Referring initially to FIGS. 1–6, FIGS. 1–3 are side, underside and top views respectively of a status alerting unit 20 embodying the invention, and FIGS. 4–6 depict the unit 20 in use in conjunction with a vehicle seat belt assembly 22 of conventional construction having a connectable buckle 24 and tongue 26. Seat belt webbing strips 28 and 30 are connected to the buckle 24 and tongue 26, respectively.

With particular reference to FIGS. 4–6, it will be appreciated that the buckle 24 has an end 32 including a slot 34 for receiving and retaining the tongue 26, as is particularly shown in FIG. 6. The buckle 24 has an exterior surface 36 (hidden in FIG. 4) which intersects the buckle end 32, and is generally parallel to the tongue 26 when the tongue 26 is inserted into the slot 34. The status alerting unit 20 is mounted to this exterior surface 36. The buckle 24 has an opposite surface 38 which, in the particular buckle 24 configuration illustrated, supports a tongue release push button 40.

Figure 1:
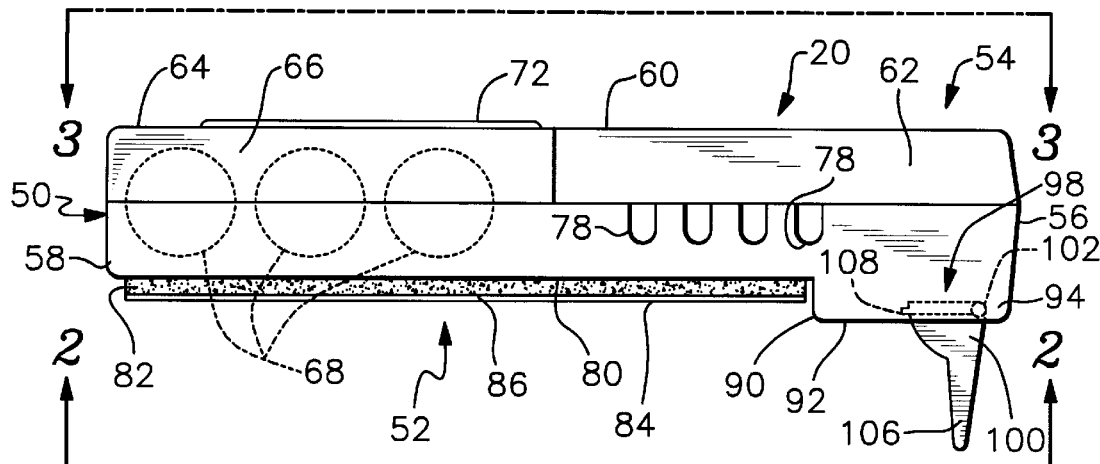
FIG. 1 is a side elevational view of a seat belt status alerting unit embodying the invention.

With particular reference to FIGS. 1–3, the unit 20 has a housing 50 with at least a main portion 52, and, in the exemplary embodiment, a projecting portion generally designated 54 and terminating in an end 56 of the housing 50. In the particular configuration illustrated, the housing 50 projecting portion 54 projects beyond the end 32 of the buckle 24 when the housing 50 is mounted to the buckle 24, as may be seen in FIGS. 4–6. The housing 50 actually comprises three separate pieces, all made of plastic: a base piece 58 extending over both the housing main portion 52 and the housing projecting portion 54, a circuitry compartment cover 60 closing a circuitry compartment 62, and a battery compartment cover 64 closing a battery compartment 66 containing three 1.5 volt battery cells.

On the battery compartment cover 64 there is an area 70 on which an identification label (not shown) may be placed, surrounded by a continuous raised ridge 72. The circuitry compartment cover 60 has a series of open slots 74 comprising a grilled opening through which sound from a speaker 76 (FIGS. 7, 9, 10, 11, 13 and 14) passes to provide appropriate audible alert signals or messages, as is more fully described hereinbelow. The speaker 76 thus comprises an element of an alert device. There are additional openings 78 formed in the side of the base piece 58, through which sound from the speaker 76 may pass.

The housing 50 main portion 52 has a mounting surface 80 mountable to the buckle exterior surface 36, as shown in FIGS. 5 and 6. It will be appreciated that a variety of mounting techniques may be employed. In the exemplary embodiment, such mounting is achieved by employing adhesive material, which may be in the form of a piece of double-sided adhesive foam material 82, particularly to accommodate any irregularities in the exterior surface 36 of the buckle 24. Prior to installation, the double-sided adhesive foam 82 is covered by a removable protective layer 84, over the actual adhesive surface 86. Other mounting techniques include the use of hook and loop fastening material.

To aid in properly positioning the housing 50 on the buckle 24, there is a locating lip 90 where the projecting portion 54 joins the housing main portion 52, and the locating lip 90 is positioned for engaging the buckle end 32. The locating lip 90 comprises an edge of a ledge 92 on the housing 50 projecting portion 54. The ledge 92 also defines an interior volume 94, and includes a recess 96.

As a result of this configuration, proper mounting of the unit 20 housing 50 to the seat belt buckle 24 is somewhat intuitive, thereby minimizing the likelihood that a user will improperly install the status alerting unit 20. Thus, and with particular reference to the orientation of FIG. 5, if a user attempts to mount the housing 50 too far to the left with reference to the buckle 24, the lip 90 and ledge 92 prevent full engagement of the double-sided foam adhesive material 82 to the buckle 24 exterior surface 36, suggesting to the user that the unit 20 is not being properly mounted and to try another way. If the housing 50 is too far to the right with reference to the buckle 24 in the orientation of FIG. 5, the projecting portion 54 projects too far, which is likely to be evident to the user (although the unit 20 likely will function correctly).

Within the housing 50 and, in the exemplary embodiment within the projecting portion 54, is a proximity sensor, generally designated 98, responsive to proximity of the seat belt buckle tongue 26 for generating BUCKLED and UNBUCKLED signals as the tongue 26 is inserted into and removed from the slot 34. Preferably, at least a portion of the proximity sensor 98 is contained within the interior volume 94 of the ledge 92. A variety of proximity sensors 98 may be employed, such as a Hall effect magnetic field sensing device (not shown), an optical sensor (not shown), or a mechanical sensing element, such as a flipper element 100 as in the exemplary embodiment.

In the exemplary embodiment, the proximity sensor 98 or flipper element 100 is mounted to the housing projecting portion 54, although it will be appreciated that other configurations are possible which do not employ the housing 50 projecting portion 54, and in which other forms of mechancial sensing elements connected to the housing 50 may be employed.

The flipper element 100 has a pivot axis 102 comprising axles 104 (FIG. 8), a tongue sensing portion 106, and a contact actuating portion 108.

Figure 10:
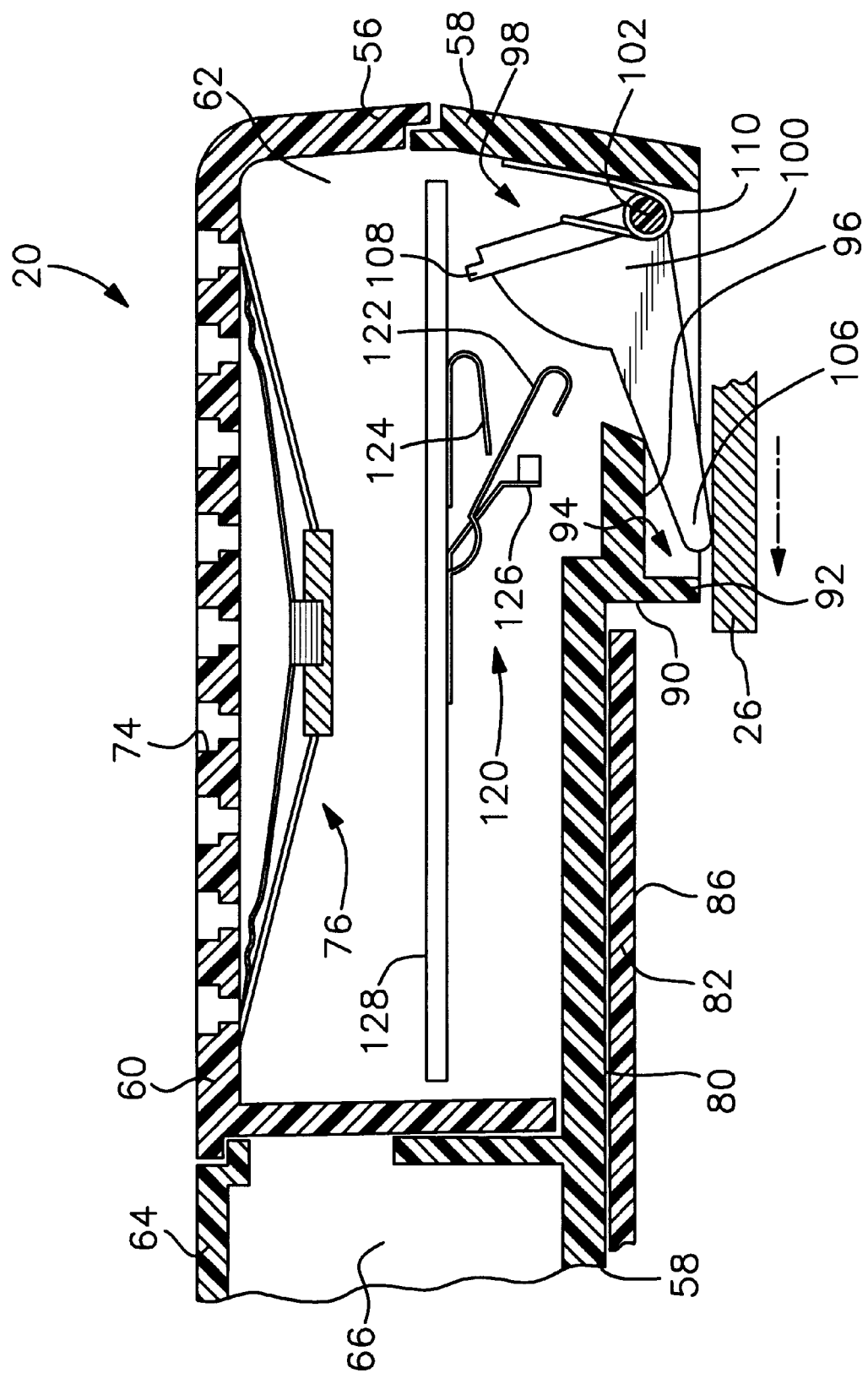
FIG. 10 is a similar view, showing the flipper element in its fully deflected position.

The tongue sensing portion 106 pivots away from and towards the buckle 24 slot 34 respectively between an extended position (FIGS. 1, 5, 7 and 8) generally perpendicular to the mounting surface 80, and a fully deflected position (FIGS. 6 and 10). The flipper element 100 is urged towards the fully-extended position by a resilient element in the form of a pair of coil springs 110 mounted on the axles 104, although only one is visible in FIG. 8. When the flipper element 100 is pivotally mounted to the housing projecting portion 54 adjacent the housing end 56 as in the exemplary embodiment, it will be appreciated that the tongue sensing portion 106 pivots away from and towards the housing main portion 52 respectively between the extended position (FIGS. 1, 5, 7 and 8) and the fully deflected position (FIGS. 6 and 10). The flipper element 100 tongue sensing portion 106 when fully deflected is at least partially received within the recess 96 in the ledge 92. In order to accommodate and be reliably actuated by a variety of seat belt tongues 26, the tongue sensing portion 106 extends laterally a distance along the housing end 56, as may be seen in FIG. 4.

Thus, the flipper element 100 is positioned such that the tongue sensing element 106 is in the extended position (FIGS. 1, 5. 7 and 8) when the tongue 26 is not inserted into the buckle 24 slot 34, and the tongue sensing portion 106 pivots at least part way towards the fully deflected position of FIGS. 6 and 10 when the tongue 26 is inserted into the buckle 24 slot 34.

Figure 7:
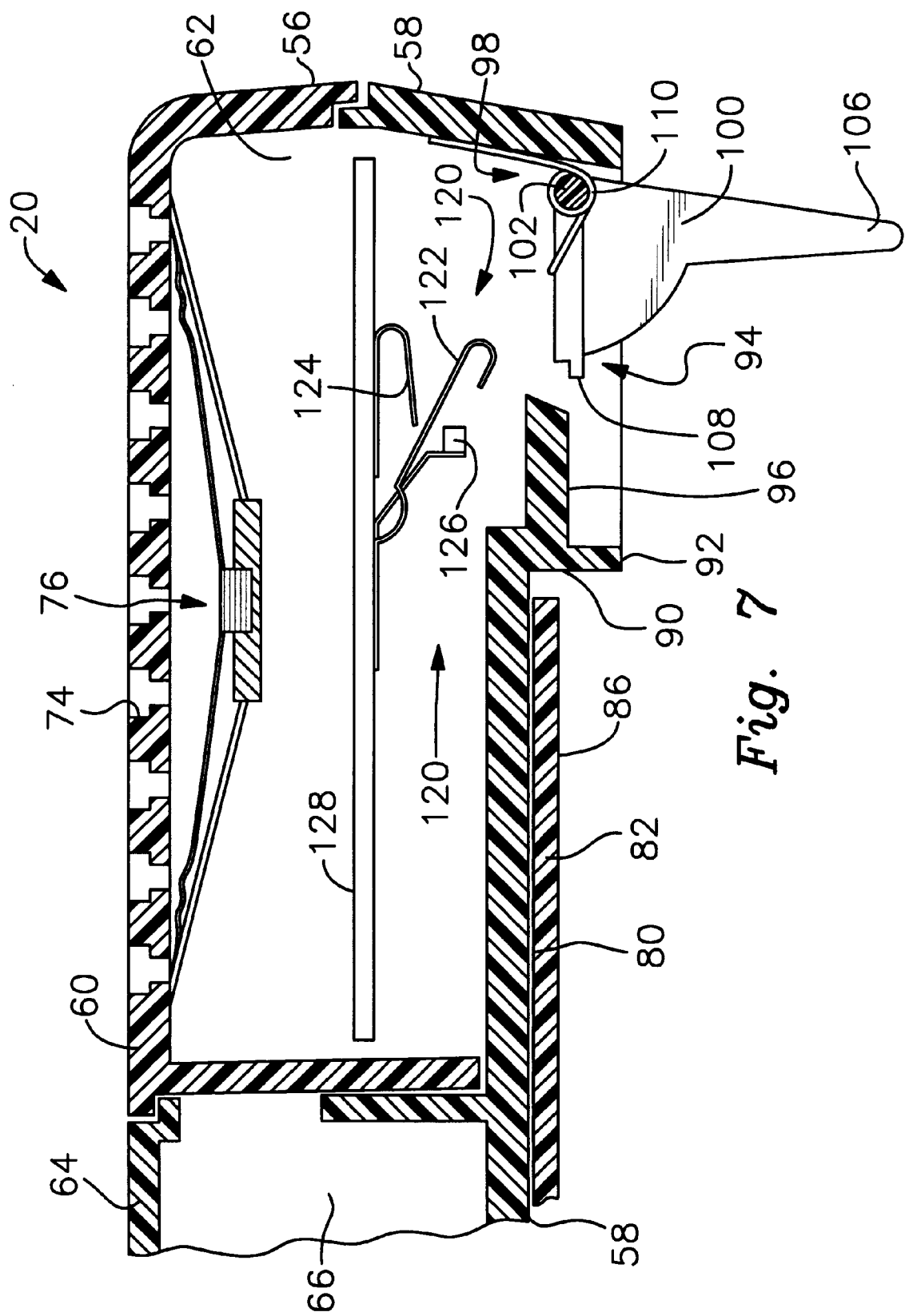
FIG. 7 is an enlarged cross-sectional view of a portion of a status alerting unit embodying the invention, showing the flipper element in its extended, at-rest position, with both the "buckled" and the "unbuckled" switch contacts open.
Figure 8:
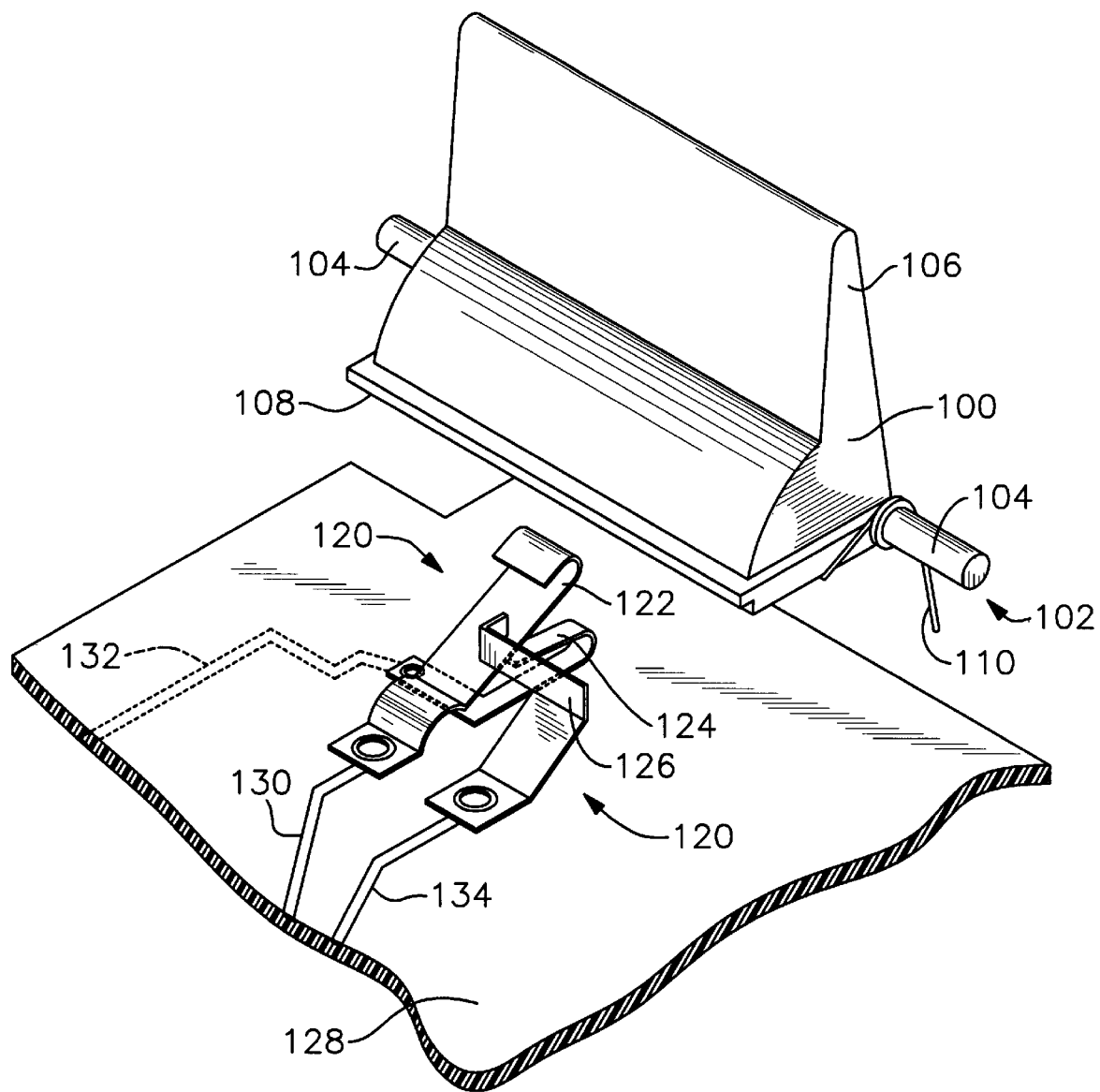
FIG. 8 is a three dimensional view corresponding to FIG. 7, showing internal contact details.

With particular reference to the enlarged views of FIGS. 7 and 8, shown are details of a first embodiment of a suitable electrical switching element, generally designated 120, but logically including associated circuitry described hereinbelow, connected to the flipper element 100 for generating the BUCKLED and UNBUCKLED signals as the tongue 26 is inserted into and removed from the buckle 24 slot 34. Also shown in FIG. 7 is the speaker 76 suitably secured against the underside of the grilled opening 74.

The electrical switching element 120 more particularly comprises an SPDT switch in the form of a moveable common contact 122, a monetary "buckled" contact 124, and a monetary "unbuckled" contact 126, all of which comprise resilient metal springs. These spring contacts 122, 124 and 126 are mounted to a printed circuit board 128, which supports various additional electronic components (not shown in FIGS. 7 and 8, but represented in the electrical schematic diagram of FIG. 14, described hereinbelow). Respective conductors 130, 132 and 134 on the printed circuit board 128 provide electrical connection to the contact springs 122, 124 and 126.

In the exemplary embodiment, the common contact 122 is connected via conductor 130 to a +4.5 volt voltage source which, in the exemplary embodiment comprises the batteries 68. It will be appreciated, however, that other voltage sources may be employed, such as photovoltaic cells, or a connection to an external voltage source, and that other voltage levels may be employed.

In the state illustrated in FIGS. 7 and 8, the flipper element 100 is in its fully-extended "unbuckled" position, and the electrical switch contacts are all open.

During operation, when the common contact 122 monetarily touches the "buckled" contact 124, the BUCKLED signal is generated. Conversely, when the common contact 122 touches the "unbuckled" contact 126, the UNBUCKLED signal is generated.

Figure 9:
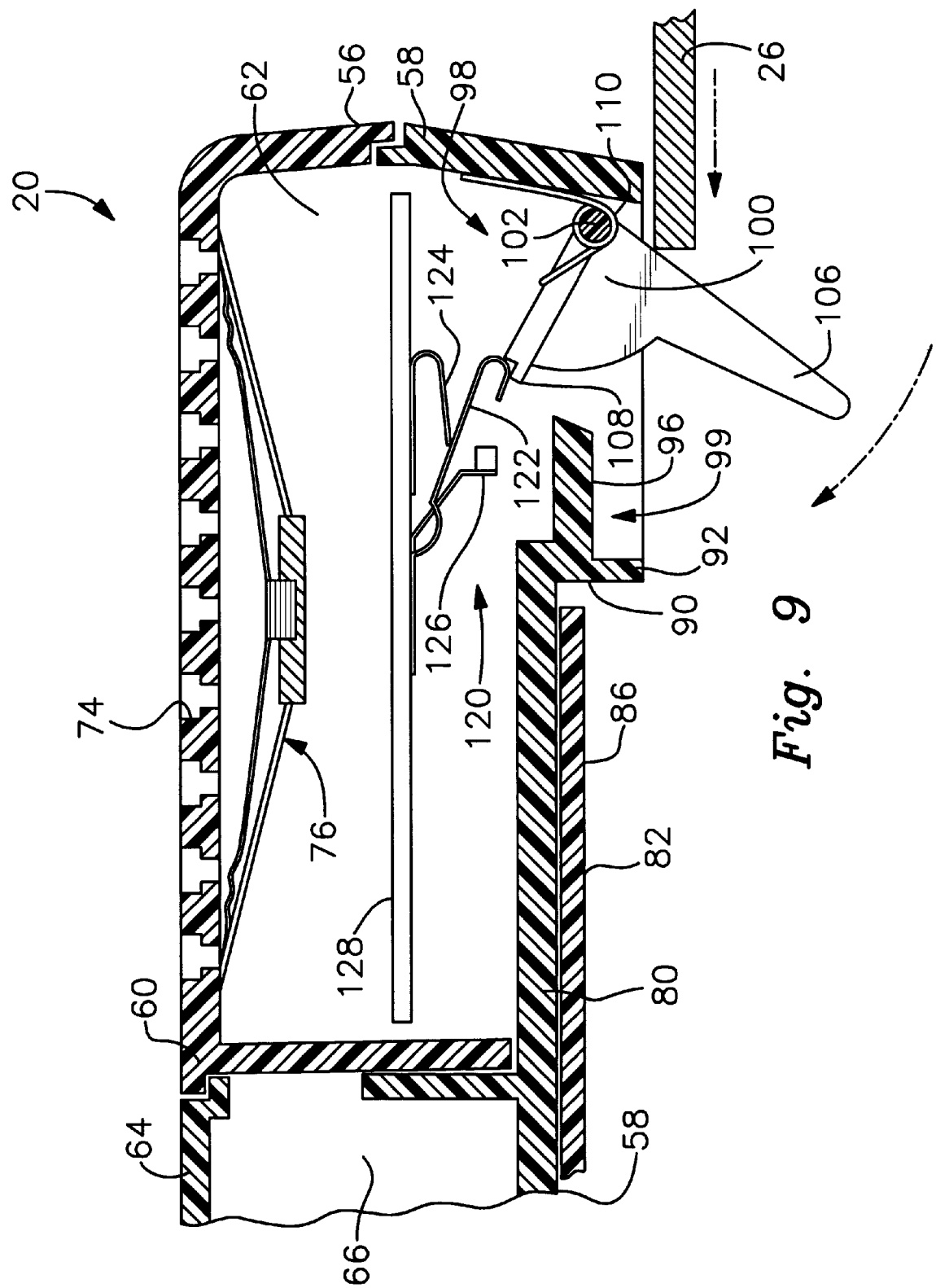
FIG. 9 is a view comparable to FIG. 7, depicting partial deflection of the flipper element and the momentary closing of the "buckled" switch contact as the seat belt tongue of FIGS. 4–6 is about to be inserted into the buckle of FIGS. 4–6.

Thus, and with reference to FIG. 9, as the tongue sensing portion 106 of the flipper element 100 is deflected due to insertion of the tongue 26 into the buckle 24 slot 34, the contact-actuating portion 108 of the flipper element 100 deflects the common spring contact 122 towards and into electrical contact with the "buckled" spring contact 124, thus generating a monetary BUCKLED signal on conductor 132.

With reference to FIG. 10, as the insertion of the tongue 26 and rotation of the flipper element 100 continues, the common contact 122 springs back to its neutral position, as the contact actuating portion 108 of the flipper element 100 moves past, until the flipper element 100 potentially, but not necessarily, reaches its fully deflected position as shown in FIG. 10.

It will be appreciated that this configuration provides a degree of lost motion accommodating a variety of seat belt assembly 22 configurations. Thus, only a partial rotation of the flipper element 100 is required to generate the BUCKLED signal as the common contact 122 meets the "buckled" contact 124, and the contact actuating portion 108 moves past the common contact 122. Further rotation beyond that initial point of electrical contact is simply lost motion, which may or may not be needed, depending upon the particular configuration of the seat belt assembly 22.

Figure 11:
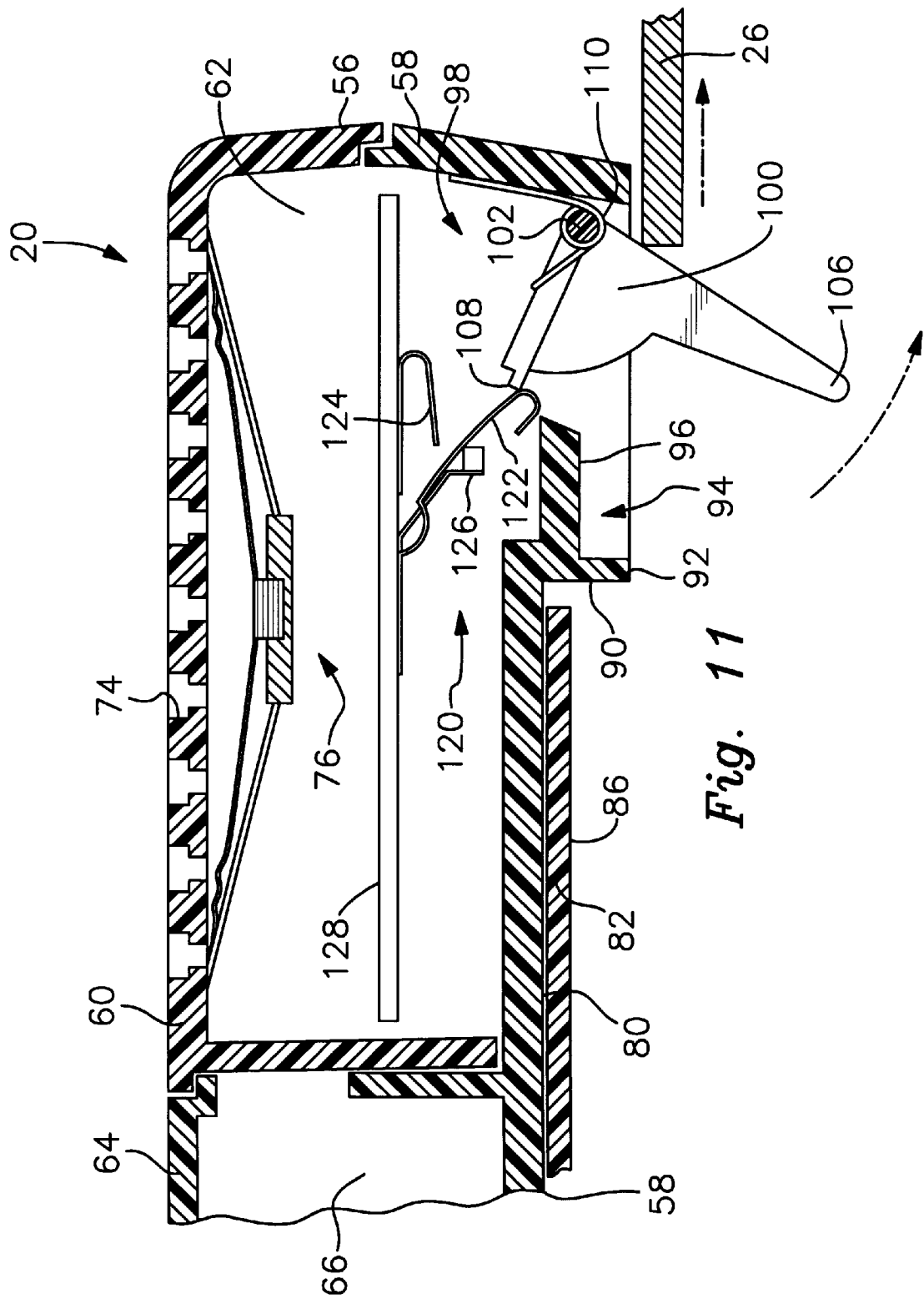
FIG. 11 is a view like that of FIG. 9, but depicting the flipper element returning from the FIG. 10 fully deflected position to the FIG. 7 at rest position, and the monetary closing of the "unbuckled" switch contact.

Likewise, and with reference to FIG. 11, as the tongue 26 is removed from the buckle 24 slot 34, allowing the flipper element 100 to rotate back towards its extended position under the urging of the coil springs 110, the contact actuating portion 108 of the flipper element 100 deflects the common contact 122 towards the "unbuckled" contact 126, making monetary contact with the switch contact portion 128 to generate the UNBUCKLED signal, as the flipper element 100 moves back towards the extended position of FIG. 7.

Accordingly, the spring contacts 122, 124 and 126 are in their undeflected, at-rest condition in either the flipper element 100 extended position of FIG. 7, or the fully deflected position of FIG. 10, as well as when the contact actuating portion 108 of the flipper 100 has moved past the initial contact point shown in FIG. 9. When undeflected, the common contact spring 122 does not contact either the "buckled" contact spring 124 or the "unbuckled" contact spring 126.

Figure 12:
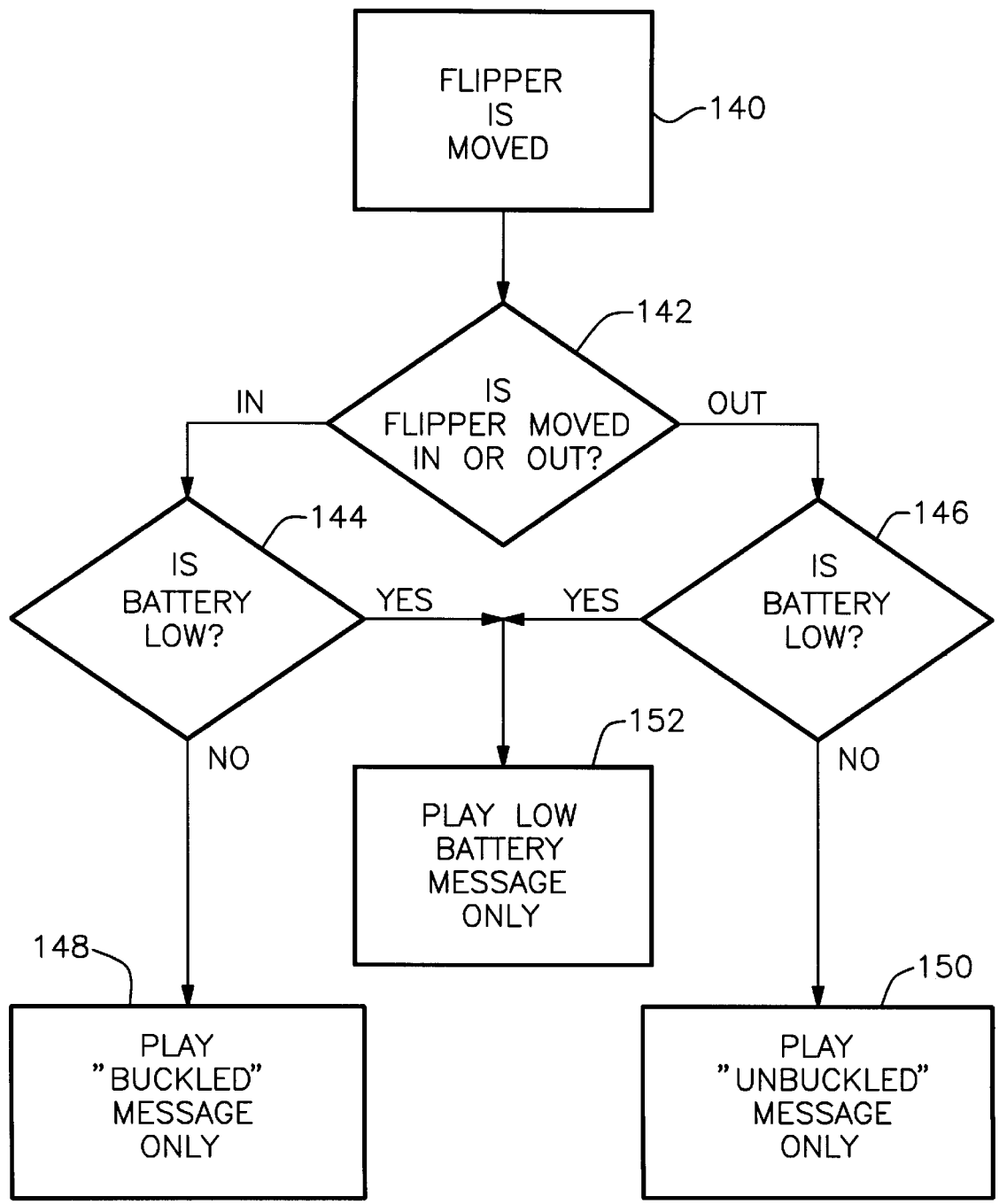
FIG. 12 is an operational flow chart representing operation of the unit.

FIG. 12 is an operational flow chart representing the operation of status alerting unit 20 as the flipper element 100 is either pivoted away from its fully extended position of FIG. 7 as the tongue 26 is inserted, or towards the FIG. 7 fully-extended position as the tongue 26 is removed from the buckle 24 slot 34. Thus, beginning with flow chart box 140, the flipper element 100 is moved, indicating the tongue 26 is either being inserted into or removed from the buckle 24 slot 34.

In decision box 142, it is determined whether the tongue sensing portion 106 of the flipper element 100 has been moved either in, that is away from the extended position of FIG. 7 and towards the fully deflected position of FIG. 10, or out, that is back towards the fully extended position of FIG. 7. Then, in either decision box 144 or decision box 146 it is determined whether the voltage source, e.g. the battery 68, is low. If the flipper tongue sensing portion 106 is being moved in (and decision box 144 determines that the battery is not low), then operation proceeds to box 148, where an audible message is played via the speaker 76, such as "I'm buckled up, are you?" Alternatively, if the flipper tongue sensing portion 106 is being moved out (and decision box 146 determines that the battery is not low) then operation proceeds to box 150, where an audible message is played via the speaker 76, such as a highly noticeable recorded "ding, ding, ding" sound. Provision may be made for recording custom messages as well.

If, however, the battery is low, then, rather than the "buckled" message of box 148, or the "unbuckled" message of box 150, a low battery message is played as indicated in box 152. In one embodiment, the low battery message is simply a single short "chirp," which sharply contrasts with the "buckled" and "unbuckled" messages. A series of "chirps" may as well be employed.

The unit 20 is designed such that power consumption is minimized when the contacts of the switching element 120 are in their neutral position, as shown in FIGS. 7 and 10. The greatest power consumption, and therefore battery drain, occurs when a message is being played via the speaker 76.

It is also important that the "low battery" warning be issued when a person is actually present to hear it, such as is the case when the seat belt is actively being buckled or unbuckled. Thus, if the "chirp" low battery message were active at all times, the possibility would exist for low battery "chirps" to be sounding when no one is present to hear the warning. Such would further deplete an already-low battery, potentially resulting in an inoperative unit 20 when operation is actually to occur.

Figure 13:
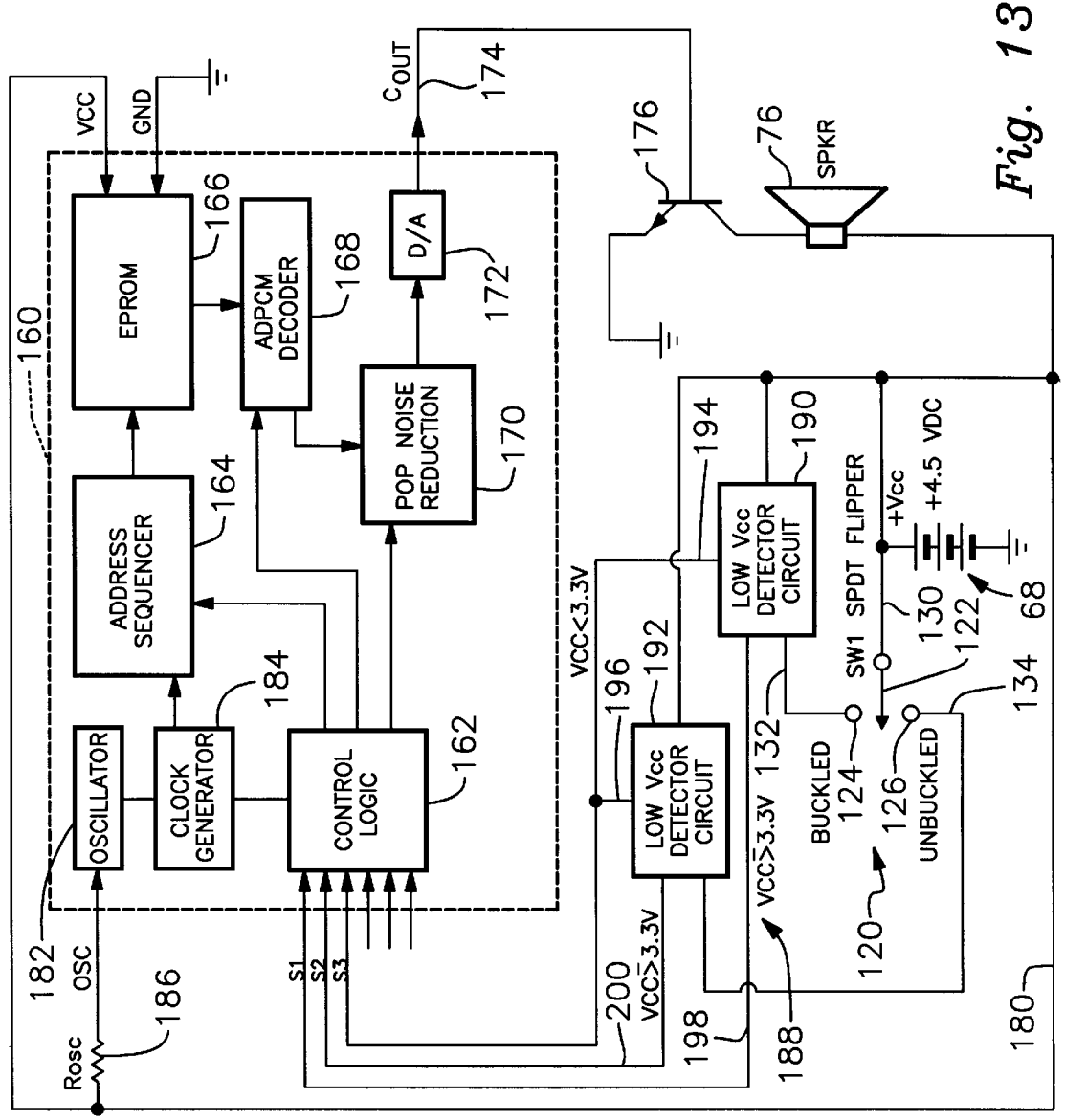
FIG. 13 is a conceptual functional block diagram representing circuitry within the unit.

FIG. 13 is a conceptual functional diagram of an exemplary embodiment implementing the operation represented in the flow chart of FIG. 12. In FIG. 13, the alert device comprises, in addition to the speaker 76, a sound chip 160 such as a part number HSV-12003 integrated circuit device capable of storing in a digital memory a plurality of audible messages, which are played when the chip 160 is triggered by respective input signals. Thus, the chip 160 has three trigger inputs, S1, S2 and S3, connected to internal control logic 162, which controls an address sequencer 164 that in turn accesses an appropriate recordings digitally stored in a suitable memory 166, in particular EPROM 166.

In this exemplary embodiment, the memory 166 is organized as three memory segments totalling 4.5 seconds in duration when played back. Thus, when input S1 is activated, the buckled message "Dong, I'm buckled up, are you?" is accessed in the EPROM 166, having a duration of 2.0 seconds. When input S2 is activated, the unbuckled message, "ding, ding, ding, ding, ding, ding, ding, ding, ding" is accessed in the EPROM 166, likewise having a duration of 2.0 seconds. When input S3 is activated, the low battery single "chirp" message is accessed in the EPROM 166, having a duration of 0.5 seconds. The digital output from EPROM 166 is applied to an ADPCM decoder 168, through pop noise reduction circuitry 170, to a digital to analog converter 172, to an output line 174 which is connected through an NPN transistor 176 to drive the speaker 76.

The battery 68 is also connected to a positive supply voltage line 180 connected to a VCC input of the chip 160. The chip 160 also includes an internal oscillator 182 and a clock generator 184, which are supplied from the positive supply voltage line 180 via an OSC input and a series resistor 186.

Also represented in FIG. 13 is a low voltage detection circuit, generally designated 188, and comprising, in FIG. 13, individual low VCC detector circuits 190 and 192, individually connected so as to be activated by the "buckled" and "unbuckled" switch contacts 124 and 126 respectively. The low VCC detector circuits 190 and 192 output signals, when activated, on respective lines 194 and 196 when battery voltage is below a predetermined threshold voltage, such as below 3.3 volts, and output signals on respective lines 198 and 200 when battery voltage is greater than or equal to the predetermined threshold voltage.

Thus, during operation, when the seat belt tongue 26 is inserted, moving the flipper element 100, moveable contact 122 momentarily energizes the "buckled" contact 124 with +4.5 volts from the battery 64, activating low VCC detector circuit 190. If battery voltage is greater than or equal to 3.3 volts, an output signal on line 198 connected to input S1 causes the "buckled" message to be played. If however, battery voltage is less than 3.3 volts, then a triggering signal is applied to input S3, activating the battery low message.

When the tongue 26 is removed, battery voltage is momentarily applied to the "unbuckled" contact 126, activating the low VCC detector circuit 192, which likewise either applies a triggering signal via line 200 to input S2 to play the "unbuckled" message, or a triggering signal to input S3 of the chip 160 to play the battery low message.

Figure 14:
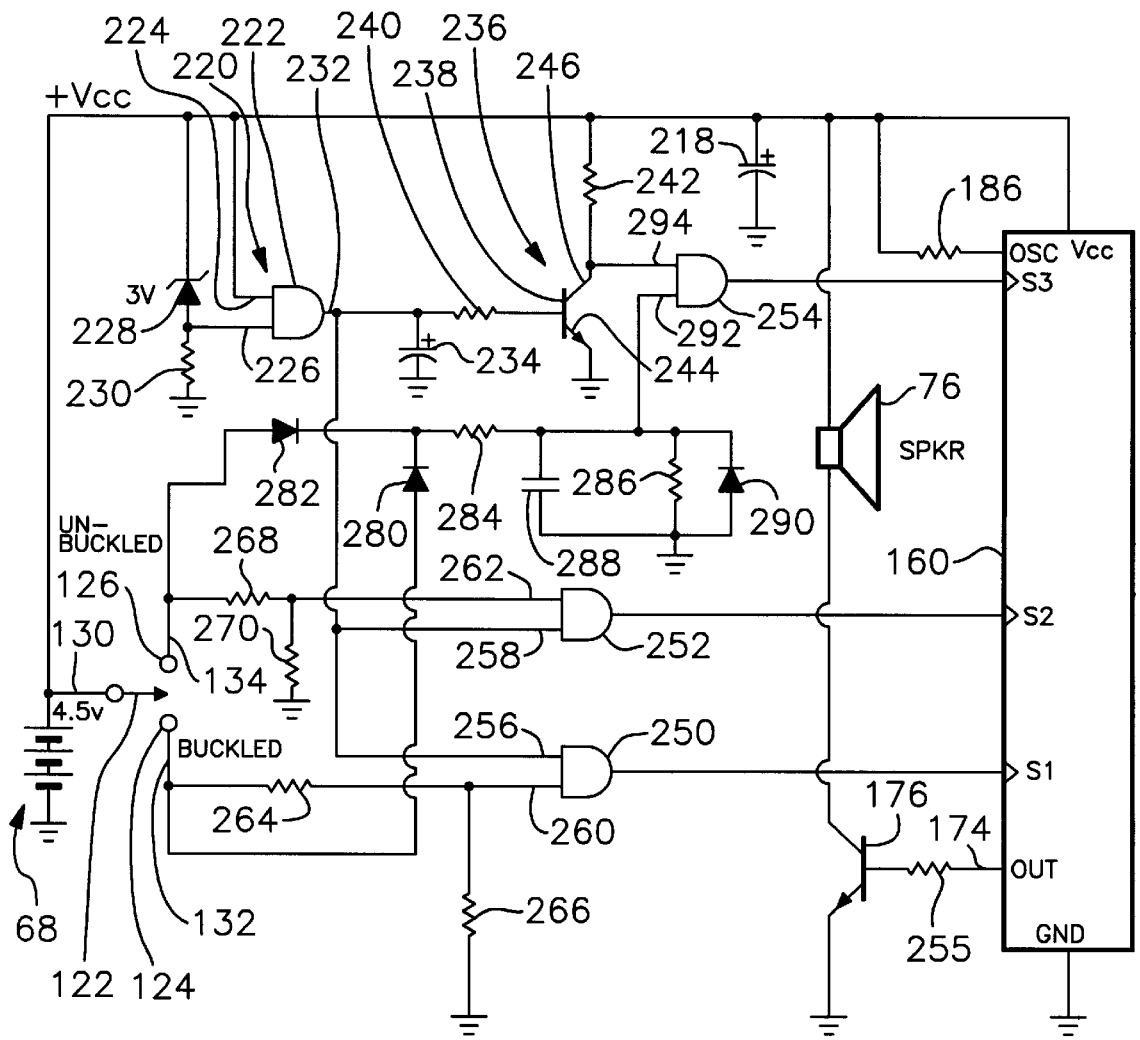
FIG. 14 is an electrical schematic diagram of circuitry included within a seat belt status alerting unit embodying the invention.

FIG. 14 is an electrical schematic diagram of an exemplary embodiment of circuitry which may be included within the status alerting unit 20. The circuitry is powered by the battery 68 which supplies a +VCC line. A decoupling capacitor 218 is connected to the +VCC line. The sound chip 160 is powered by the +VCC line, and functions as described above with reference to FIG. 13.

In FIG. 14, a low voltage detection circuit, generally designated 220, comprises AND gate 222 having one input 224 tied to a +VCC line which is thus at logic high, and another input 226 connected to the junction of a 3.0 volt reversed-biased Zener diode 228 and a resistor 230. One terminal of the Zener diode 228 is connected to the +VCC line. So long as the voltage on the +VCC line is greater than or equal to 3.3 volts, the voltage on AND gate 222 input 226 is sufficiently high to be interpreted as logic high, and the output 232 of AND gate 222 remains at logic high, indicating that the battery 68 voltage is not low. When battery 68 voltage become too low, the output 232 of AND gate 222 goes to logic low. A capacitor 234 connected to the AND gate 222 output 232 minimizes transient effects.

AND gate 222 output 232 is connected to a logic inverter circuit 236 comprising an NPN transistor 238, a series base resistor 240 and a collector load resistor 242. The emitter 244 of transistor 238 is connected to circuit ground, and the collector 246 of transistor 238 serves as the inverter 236 output.

The three triggering inputs S1, S2 and S3 of message chip 160 are driven by the outputs of respective AND gates 250, 252 and 254. The inputs S1, S2 and S3 are each edge triggered. Thus when a particular one of the inputs S1, S2 or S3 goes from logic low to logic high, a corresponding message in played. The logic is such that only one of the AND gates 250, 252 or 254 are activated at a given time, depending upon the state of the switching element 120, and the state of the low battery voltage detection circuit 220. When the output of AND gate 250 goes high to trigger input S1, the "buckled" message is played. When the output of AND gate 252 goes high to trigger input S2, the "unbuckled" message is played. When the output of AND gate 254 goes high to trigger input S3, the low battery warning message is played. As described above with reference to FIG. 13, messages are played via the speaker 76, driven by transistor 176, which has a base resistor 255. Other sound output devices may be employed, such as a piezoelectric buzzer, and other optional output terminal of the chip 160 may be used.

The output 232 of AND gate 222 in the low battery voltage detection circuit 220 is connected what are in effect enabling inputs 256 and 258 of the AND gates 250 and 252, respectively. The other inputs 260 and 262 of the AND gates 250 and 252 are connected to the "buckled" switch contact 124 and the "unbuckled" switch contact 126, respectively, via voltage dividers 264, 266 and 268, 270.

In the operation of the circuit of FIG. 14 as thus far described, assuming battery 68 voltage is greater than 3.3 volts, and the AND gate enabling inputs 258 and 260 accordingly are at logic high, operation of the switching element 260 to supply battery voltage to either the "buckled" contact 124 or the "unbuckled" contact 126 activates the corresponding AND gate 250 or 252, thus in effect passing the signal on to the appropriate triggering input S1 or S2.

The "buckled" and "unbuckled" switch contacts 124 and 126 are also connected, through respective isolation diodes 280 and 282 to a noise reduction network comprising resistors 284 and 286, a capacitor 288 and a diode 290, to an input 292 of AND gate 254. The other input 294 of AND gate 254 may be viewed as an enabling input driven to logic high by the output of the inverter 236 when battery voltage is low.

When either the "buckled" contact 124 or "unbuckled" contact 126 is triggered, a logic high signal is applied via isolation diodes 280 and 282 to input 292 of AND gate 254. If battery voltage is low, the enabling input 294 of AND gate 254 is high, and the logic high signal applied to input 292 causes AND gate 254 to output a signal to trigger input S3 of chip 160.

Thus, the low voltage detection circuit 220 is powered and active at all times, holding the enabling inputs 258 and 260 of AND gates 250 and 252 at logic high when the battery voltage is above the voltage threshold, and holding the enabling input 294 of the AND gate 254 at logic high when the battery voltage is below the predetermined threshold. Accordingly, when the electrical switching element 120 is operated, a triggering signal is applied to one and only one of the chip 160 inputs S1, S2 or S3, without delay.

Referring next to FIGS. 15–18, shown is another status alerting unit 300 embodying the invention, including an alternative form of electrical switching element, generally designated 320, but logically including associated circuitry, likewise connected to the flipper element 100 for generating the BUCKLED and UNBUCKLED signals as the tongue 26 is inserted into and removed from the buckle 24 slot 34 as described hereinabove with reference to FIGS. 7–11.

The alternative electrical switching element 320 differs from the switching element 120 described hereinabove in that the switch contacts are not momentary. Thus, one of the contacts of the switching element 320 is closed in either the "unbuckled" or the "buckled" position, and the contacts are both momentarily open only while the flipper element 100 is moving between the "unbuckled" and "buckled" position, or vice-versa.

The electrical switching element 320 more particularly comprises an SPDT switch in the form of a moveable common contact 322, a normally open "buckled" contact 324, and a normally closed "unbuckled" contact 326. The moveable common contact 322 comprises a resilient metal spring. The "buckled" contact 324 takes the form of a flat stainless steel plate on the circuit board 128, and is actually contacted by a dimple 329 comprising part of the moveable contact 322. Representative conductors 330, 332, and 334 on the printed circuit board 128 provide electrical connection to the contacts 322, 324, and 326. The common contact 322 is connected via conductor 330 to a +4.5 volt voltage source, comprising the batteries 68.

Figure 15:
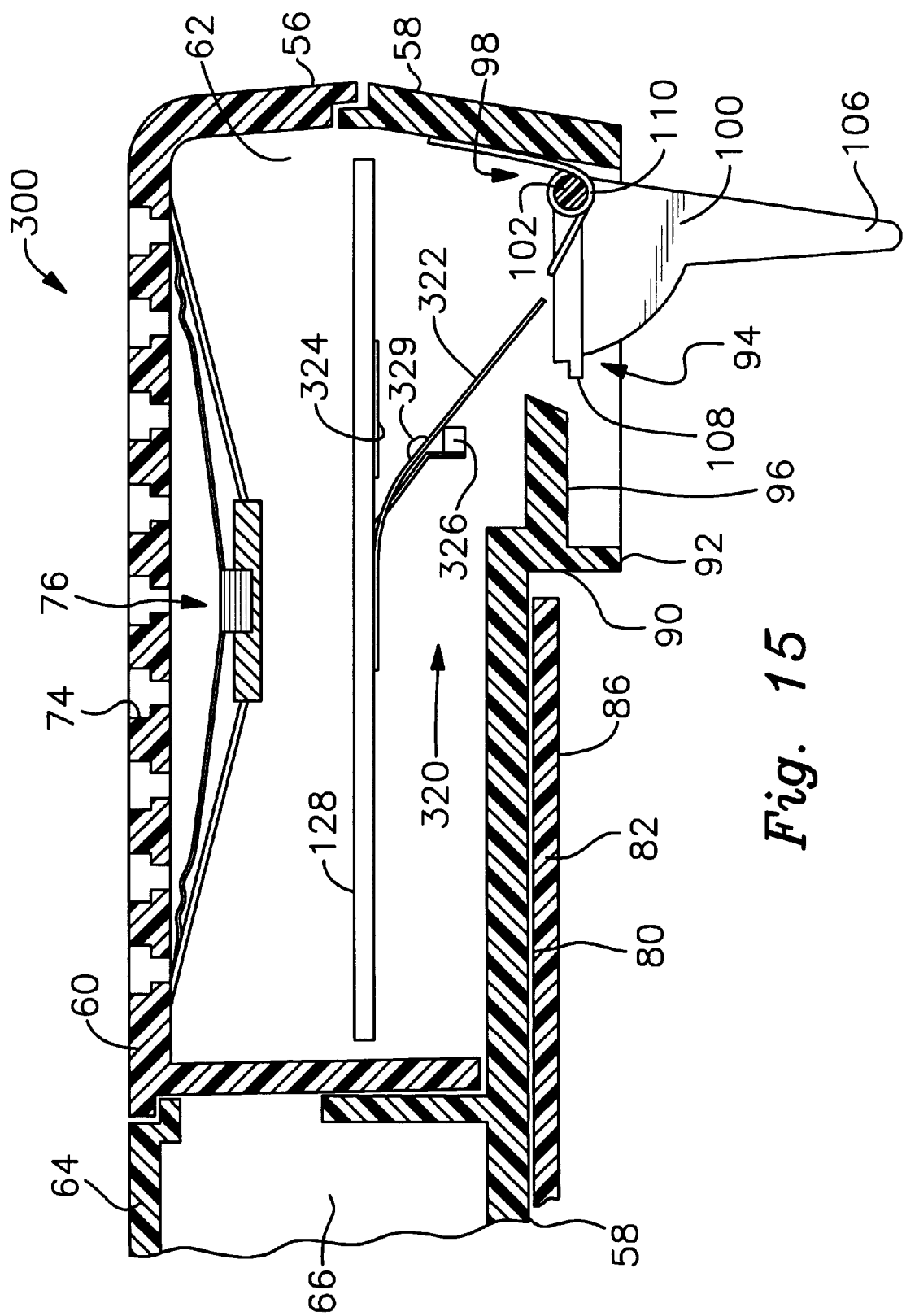
FIG. 15, as an alternative to FIG. 7, is an enlarged cross-sectional view of a portion of another status alerting unit embodying the invention, showing the flipper element in its extended, at-rest position, with the "unbuckled" switch contracts closed.
Figure 16:
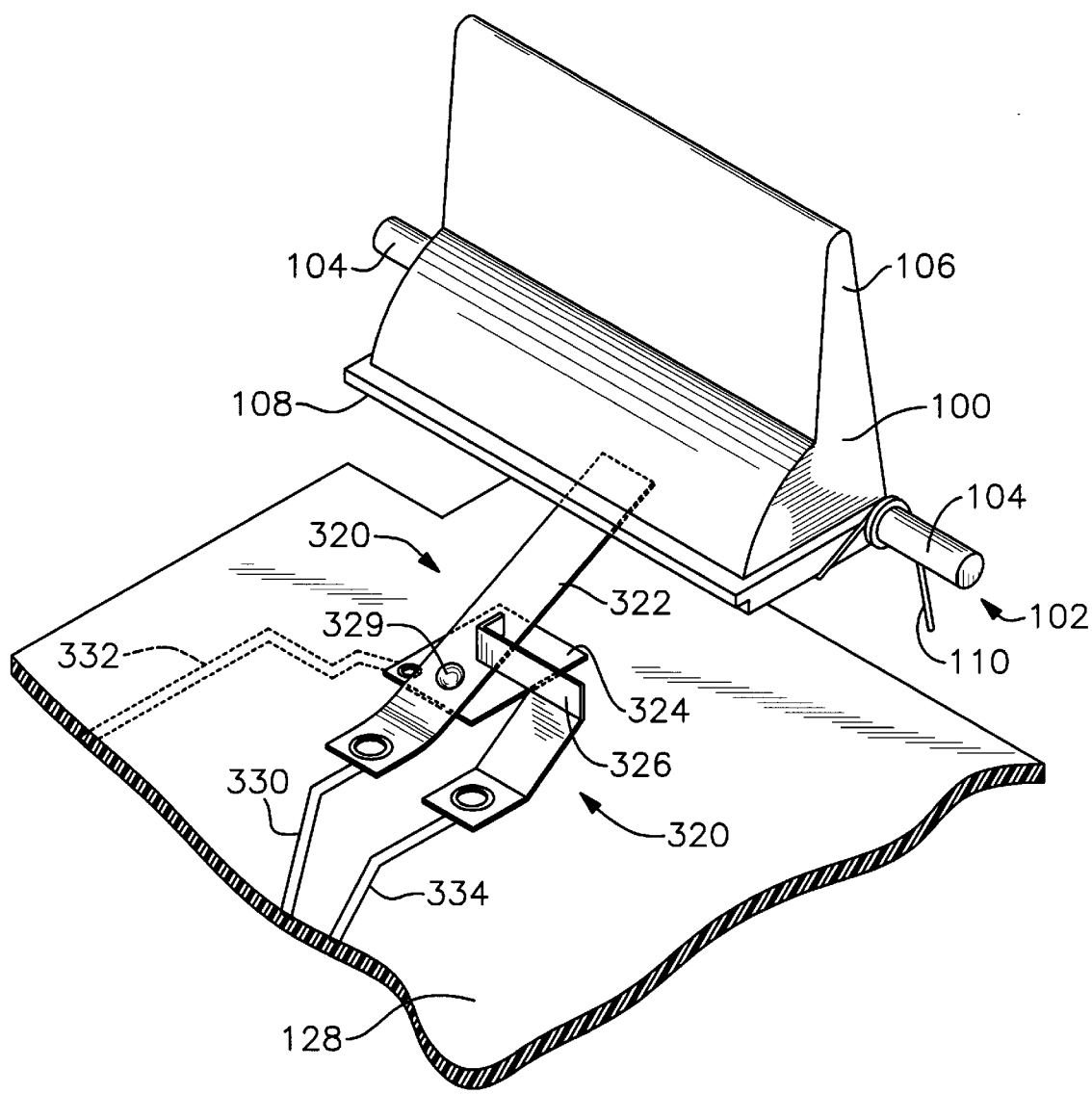
FIG. 16 is a three dimensional view corresponding to FIG. 15, showing internal contact details of the alternative.

In the state illustrated in FIGS. 15 and 16, the flipper element 100 is in its fully-extended "unbuckled" position, and the electrical connection is closed between the common contact 322 and the "unbuckled" contact 326.

During operation, when the common contact 322 initially makes electrical connection with the "buckled" contact 324, the BUCKLED signal is generated. Conversely, when the common contact 322 initially touches the "unbuckled" contact 326, the UNBUCKLED signal is generated. In each case, the BUCKLED or UNBUCKLED signal comprises the leading edge of the resultant electrical pulse, going from logic low to logic high. Thus, the particular signal, BUCKLED or UNBUCKLED, is generated when the respective electrical connection between contacts 322 and 324, or between contacts 322 and 326, is initially closed, and the subsequent maintaining of the particular contact in the closed condition has no further effect.

Figure 17:
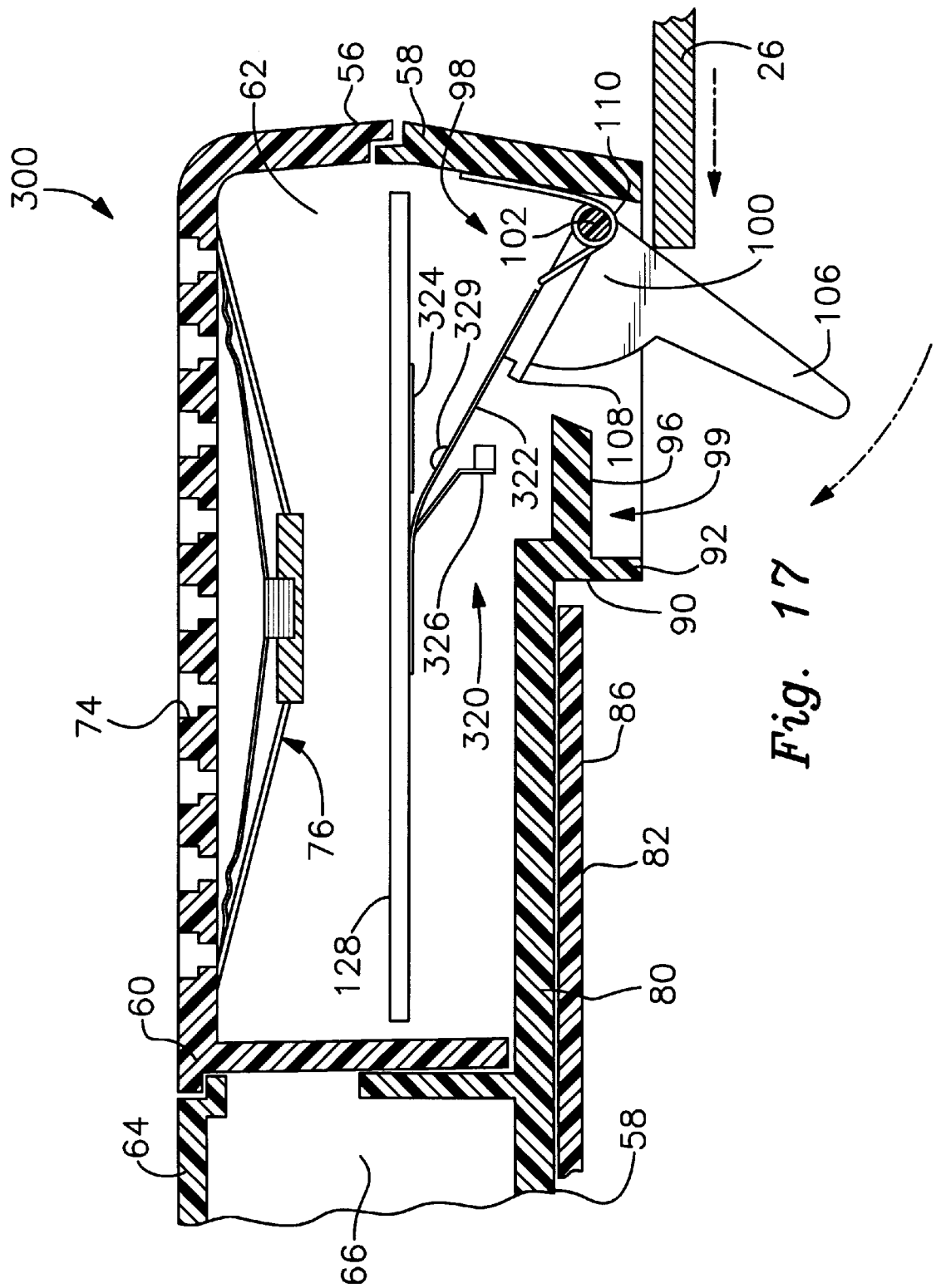
FIG. 17 is a view comparable to FIG. 15, depicting partial deflection of the flipper element and the initial closing of the "buckled" switch contact as the seat belt tongue of FIGS. 4–6 is about to be inserted into the buckle of FIGS. 4–6.

With reference to FIG. 17, as the tongue-sensing portion 106 of the flipper element 100 is deflected due to insertion of the tongue 26 into the buckle 24 slot 34, the contact-actuating portion 108 of the flipper element 100 deflects the common spring contact 322 away from the "unbuckled" contact 326, opening the electrical connection to the "unbuckled" contact 326. FIG. 17 thus depicts a momentary intermediate condition during which both contacts are open. During this interval when neither the electrical connection to the "unbuckled" contact 326 nor the "buckled" contact 324 is closed, the battery 68 voltage level is checked to see whether voltage is below a predetermined threshold. Exemplary circuitry implementing this operation is described below with reference to FIG. 19.

Figure 18:
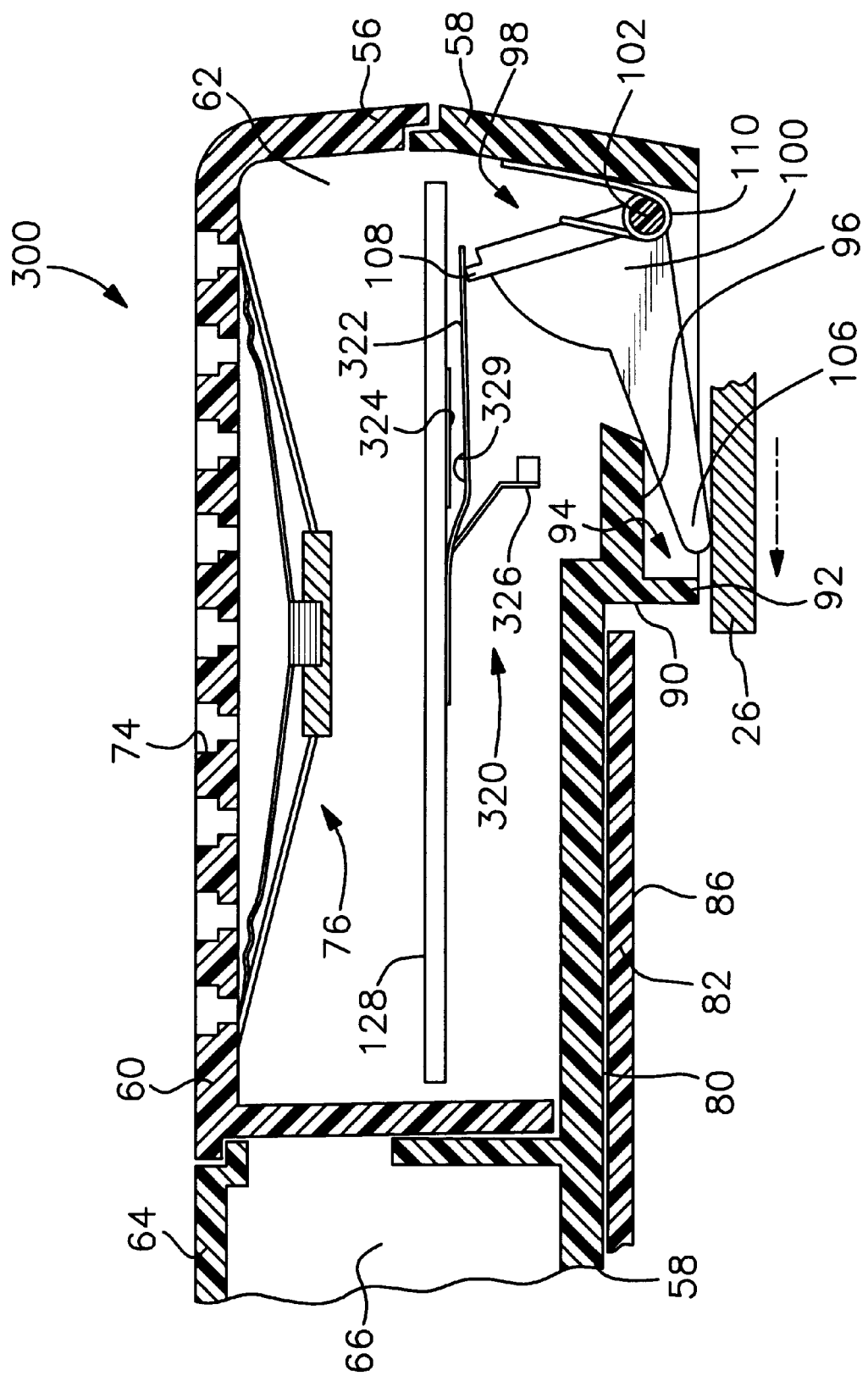
FIG. 18 is a similar view, showing the flipper element in its fully deflected position, while the "buckled" switch contact remains closed.

As insertion of the tongue 26 and rotation of the flipper element 100 continues, an electrical connection is closed between the dimple portion 329 of the common contact 322 and the "buckled" contact 324 (although the point of initial contact is not specifically shown), as the flipper element 100 moves, potentially to its fully deflected position illustrated in FIG. 18. Such motion of the flipper element 100 past the point of initial closing of the contact with the "buckled" contact 324 and the fully deflected position of FIG. 18 represents lost motion, accommodated by simple deflection of the spring-like common contact 322. Thus, it is not necessary for the flipper element 100 to have reached the fully deflected position of FIG. 18 for the "unbuckled" contact 326 to be closed.

As the tongue 26 is removed from the buckle 24 slot 34, allowing the flipper element 100 to rotate back towards its extended position under the urging of the coil springs 110, the contact-actuating portion 108 of the flipper element 100 allows the common contact 322 to first open the electrical connection to the "buckled" contact 324, and subsequently close the electrical connection to the "unbuckled" contact 326 to generate the UNBUCKLED signal, as the flipper element 100 moves back towards the extended position of FIGS. 15 and 16. Again there is an interval when neither electrical connection is closed, during which interval the battery 68 voltage level is checked.

Figure 19:
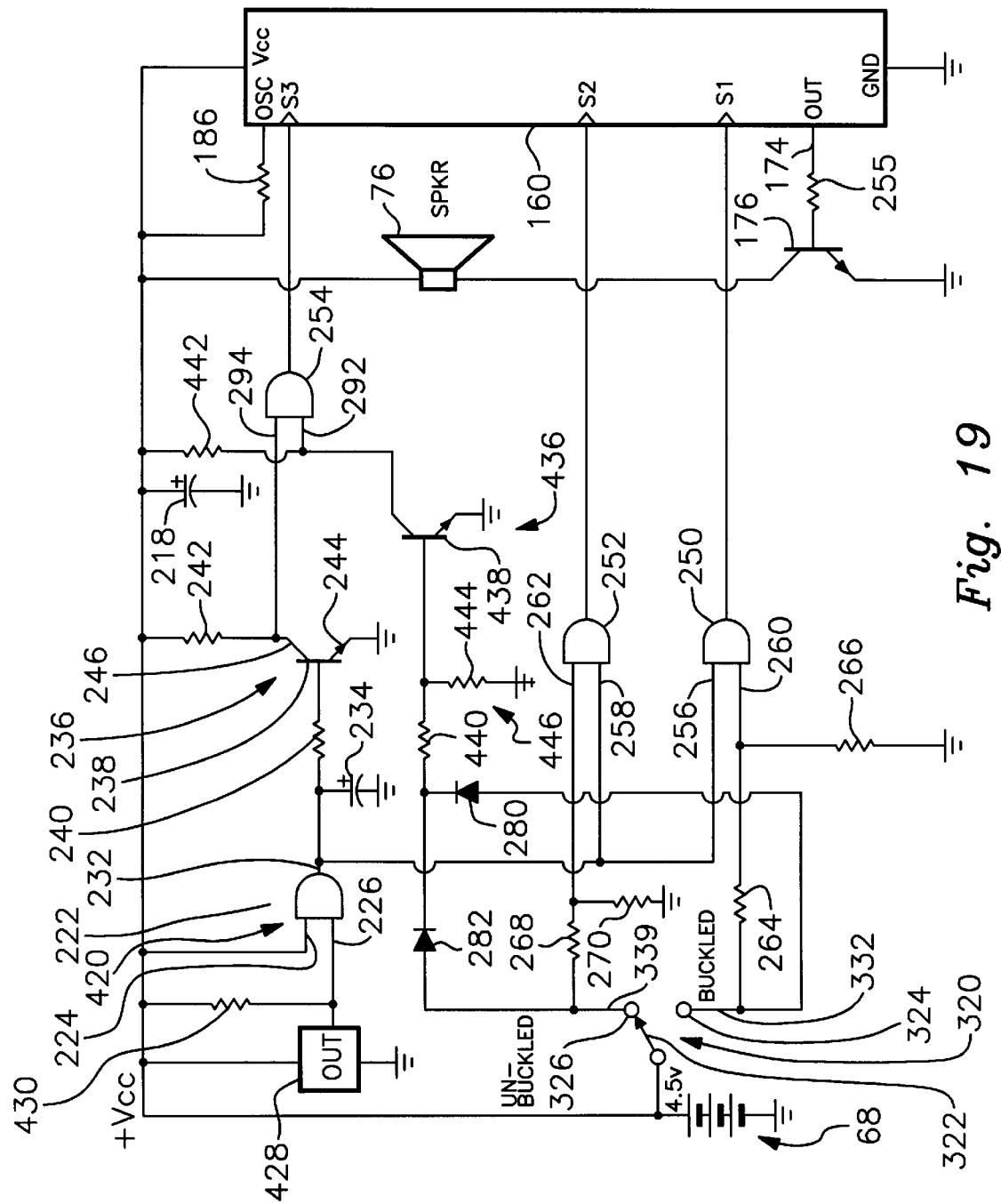
FIG. 19 is an electrical schematic diagram, as an alternative to FIG. 15, of circuitry included within the seat belt status alerting unit of FIGS. 15–18 embodying the invention.

FIG. 19 is a modification of the electrical schematic diagram of FIG. 16, modified to operate with the alternative contact arrangement 320 of FIGS. 15–18. Circuit components which are the same as and unchanged in function with reference to the circuit of FIG. 14 have the same reference numerals as in FIG. 14.

In FIG. 19, a low voltage detection circuit, generally designated 420, comprises the AND gate 222 having one input 224 tied to the +VCC line which is thus at logic high, and the other input 226 connected to the output of a voltage regulator integrated circuit 428, having a pull up resistor 430 also connected to its output. The operation of the low voltage circuit 420 is generally the same as the operation of the low voltage detection circuit 220 of FIG. 14, except that the integrated circuit voltage regulator 428 provides more stable operation. When the voltage on the +VCC line is too low for proper operation of the integrated circuit voltage regulator 428, its output voltage drops sufficiently low to be interpreted as a logic low by the AND gate 222.

In addition to the inverter circuit 236 connected to the output of 232 of AND gate 222 and driving input 294 of AND gate 254, a second logic inverter circuit 436 comprising an NPN transistor 438, a series base resistor 440 and a collector load resistor 442 drives input 222 of the AND gate 254. A resistor 444 cooperates with the series resistor 440 to form a voltage divider 446.

Operation of the resultant circuit in FIG. 19 depends upon the input S1, S2 and S3 of the sound chip 160 being edge triggered, activated when the respected input goes from logic low to logic high.

In FIG. 19, the output of the low voltage detection circuit 420 is in effect enabled by the AND gate 254 only when neither the "unbuckled" contact 326 nor the "buckled" contact 324 is closed. Accordingly, the output of low voltage detection circuit 420 is enabled only when the common contact 322 is traveling between the "unbuckled" and "buckled" contacts 326 and 324, in either direction.

In FIG. 19 the isolation diodes 280 and 282 comprise a logical OR circuit, driving the output of logic inverter 436 low when battery voltage is applied to either the "buckled" contact 324 or the "unbuckled" contact 326. Only when both contacts 324 and 326 are at logic low does the output of inverters 436 go high, activating input 292 of AND gate 254, and triggering sound chip 160 input S3 only in the event the output of inverter 236 is also high at that time, indicating the battery low condition.

Although the exemplary embodiment of FIGS. 7–11 and 14 employs an SPDT switch with momentary contacts, and the exemplary embodiment of FIGS. 15–19 employs an SPDT switch with contacts that remain closed in either the "unbuckled" or the "buckled" position and are both momentarily open only while the flipper element 100 is moving, other switching arrangements may be employed, such as a SPST switch, with a corresponding change in the associated logic circuitry. The use of SPDT switches however facilitates the provision of the low voltage detection circuits 220 and 420. The switching element may be viewed as a combination of a mechanical switch contact and associated logic circuitry, or even instructions programmed into a microcontroller, to generate the BUCKLED and UNBUCKLED signals applied to edge-triggered inputs S1 and S2 of the sound chip 160. The particular forms of switching elements 120 and 320 employed in the exemplary embodiments however represent convenient approaches to generating the BUCKLED and UNBUCKLED signals in view of the pivotal motion of the flipper element 100, which makes it more difficult to provide sliding contacts on a printed circuit board.

While exemplary embodiments of the invention have been illustrated and described herein, it is realized that numerous modifications and changes will occur to those skilled in the art. It is therefore to be understood that the appended claims are intended to cover all such modifications and changes that fall within the true spirit and scope of the invention.

What is claimed is:

1. A status alerting unit for a seat belt having a connectable buckle and tongue, the buckle having an end with a slot for receiving the tongue and an exterior surface intersecting the buckle end and generally parallel to the tongue when the tongue is inserted into the slot, said unit comprising:

a housing having at least a main portion with a mounting surface mountable to the buckle exterior surface;

a flipper element pivotally mounted to said housing, said flipper element including a tongue sensing portion which pivots away from and towards the slot respectively between an extended position generally perpendicular to said mounting surface and a fully deflected position, said flipper element being positioned such that said tongue sensing portion is in the extended position when the tongue is not inserted into the buckle slot and said tongue sensing portion pivots at least part way towards the fully deflected position when the tongue is inserted into the buckle slot;

at least one electrical switching element connected to said flipper element for generating BUCKLED and UNBUCKLED signals as the tongue is inserted into and removed from the slot; and an alert device connected to said electrical switching element for generating respective buckled and unbuckled alert signals in response to the BUCKLED and UNBUCKLED signals.

2. The unit of claim 1, wherein said alert device comprises an audible alert device.

3. The unit of claim 1, wherein said alert device comprises a voice message device.

4. The unit of claim 1, which comprises adhesive material on said mounting surface for adhering said mounting surface to the buckle exterior surface.

5. The unit of claim 1, wherein said housing comprises a locating lip for engaging the buckle end to aid in properly positioning said housing on the buckle.

6. The unit of claim 5, wherein said lip comprises a ledge including a recess into which said flipper element tongue sensing portion is at least partially received when in the fully deflected position.

7. The unit of claim 1, wherein said tongue sensing portion extends laterally a distance along said housing.

8. The unit of claim 1, wherein said electrical switching element generates the BUCKLED signal when said tongue sensing portion has pivoted only part way towards the fully deflected position.

9. The unit of claim 8, wherein said electrical switching element generates the UNBUCKLED signal when said tongue sensing portion has pivoted at least part way back towards the extended position.

10. The unit of claim 1, wherein:

said alert device additionally generates a low voltage alert signal in response to a LOW VOLTAGE signal; and which further comprises:

a voltage source for powering said alert device;

a low voltage detection circuit connected to said voltage source for determining whether voltage source voltage is below a predetermined threshold voltage; and said low voltage detection circuit being operable in response to at least one of the BUCKLED and UNBUCKLED signals to pass the at least one of the BUCKLED and UNBUCKLED signals on to said alert device only when voltage source voltage is not below the predetermined threshold voltage, and to apply the LOW VOLTAGE signal to said alert device when voltage source voltage is below the predetermined threshold voltage.

11. A status alerting unit for a seat belt having a connectable buckle and tongue, the buckle having an end with a slot for receiving the tongue and an exterior surface intersecting the buckle end and generally parallel to the tongue when the tongue is inserted into the slot, said unit comprising:

a housing having a main portion with a mounting surface mountable to the buckle exterior surface, and a projecting portion which projects beyond the buckle end when said housing is mounted to the buckle, said projecting portion terminating in an end of said housing;

a flipper element pivotally mounted to said housing projecting portion adjacent said housing end, said flipper element including a tongue sensing portion which pivots away from and towards said housing main portion respectively between an extended position generally perpendicular to said mounting surface and a fully deflected position, said flipper element being positioned such that said tongue sensing portion is in the extended position when the tongue is not inserted into the buckle slot and said tongue sensing portion pivots at least part way towards the fully deflected position when the tongue is inserted into the buckle slot;

at least one electrical switching element connected to said flipper element for generating BUCKLED and UNBUCKLED signals as the tongue is inserted into and removed from the slot; and an alert device connected to said electrical switching element for generating respective buckled and unbuckled alert signals in response to the BUCKLED and UNBUCKLED signals.

12. The unit of claim 11, wherein said alert device comprises an audible alert device.

13. The unit of claim 11, wherein said alert device comprises a voice message device.

14. The unit of claim 11, which comprises adhesive material on said mounting surface for adhering said mounting surface to the buckle exterior surface.

15. The unit of claim 11, wherein said housing comprises a locating lip where said projecting portion joins said housing main portion for engaging the buckle end to aid in properly positioning said housing on the buckle.

16. The unit of claim 15, wherein said lip comprises a ledge on said housing projecting portion, said ledge including a recess into which said flipper element tongue sensing portion is at least partially received when in the fully deflected position.

17. The unit of claim 15, wherein said tongue sensing portion extends laterally a distance along said housing end.

18. The unit of claim 15, wherein said electrical switching element generates the BUCKLED signal when said tongue sensing portion has pivoted only part way towards the fully deflected position.

19. The unit of claim 18, wherein said electrical switching element generates the UNBUCKLED signal when said tongue sensing portion has pivoted at least part way back towards the extended position.

20. The unit of claim 11, wherein:
said alert device additionally generates a low voltage alert signal in response to a LOW VOLTAGE signal; and which further comprises:
a voltage source for powering said alert device;
a low voltage detection circuit connected to said voltage source for determining whether voltage source voltage is below a predetermined threshold voltage; and
said low voltage detection circuit being operable in response to at least one of the BUCKLED and UNBUCKLED signals to pass the at least one of the BUCKLED and UNBUCKLED signals on to said alert device only when voltage source voltage is not below the predetermined threshold voltage, and to apply the LOW VOLTAGE signal to said alert device when voltage source voltage is below the predetermined threshold voltage.

21. A status alerting unit for a seat belt having a connectable buckle and tongue, the buckle having an end with a slot for receiving the tongue and an exterior surface intersecting the buckle end and generally parallel to the tongue when the tongue is inserted into the slot, said unit comprising:
a housing having a housing main portion and a housing projecting portion with a mounting surface mountable to the buckle exterior surface, and wherein said projecting portion projects beyond the buckle end when said housing is mounted to the buckle;
a proximity sensor carried by said housing projecting portion responsive to proximity of the tongue for generating BUCKLED and UNBUCKLED signals as the tongue is inserted into and removed from the slot; and
an alert device connected to said proximity sensor for generating respective buckled and unbuckled alert signals in response to the BUCKLED and UNBUCKLED signals.

22. The unit of claim 21, wherein said alert device comprises an audible alert device.

23. The unit of claim 21, wherein said alert device comprises a voice message device.

24. The unit of claim 21, which comprises adhesive material on said mounting surface for adhering said mounting surface to the buckle exterior surface.

25. The unit of claim 21, wherein said housing comprises a locating lip where said projecting portion joins said housing main portion for engaging the buckle end to aid in properly positioning said housing on the buckle.

26. The unit of claim 25, wherein said lip comprises a ledge on said housing projecting portion, said ledge defining an interior volume and at least a portion of said proximity sensor being contained within said interior volume.

27. The unit of claim 21, wherein:
said alert device additionally generates a low voltage alert signal in response to a LOW VOLTAGE signal; and which further comprises:
a voltage source for powering said alert device;
a low voltage detection circuit connected to said voltage source for determining whether voltage source voltage is below a predetermined threshold voltage; and
said low voltage detection circuit being operable in response to at least one of the BUCKLED and UNBUCKLED signals, to pass the at least one of the BUCKLED and UNBUCKLED signals on to said alert device only when voltage source voltage is not below the predetermined threshold voltage, and to apply the LOW VOLTAGE signal to said alert device when voltage source voltage is below the predetermined threshold voltage.

* * * * *